INVENTOR
Albert Simon
BY Bauer & Seymour
ATTORNEYS

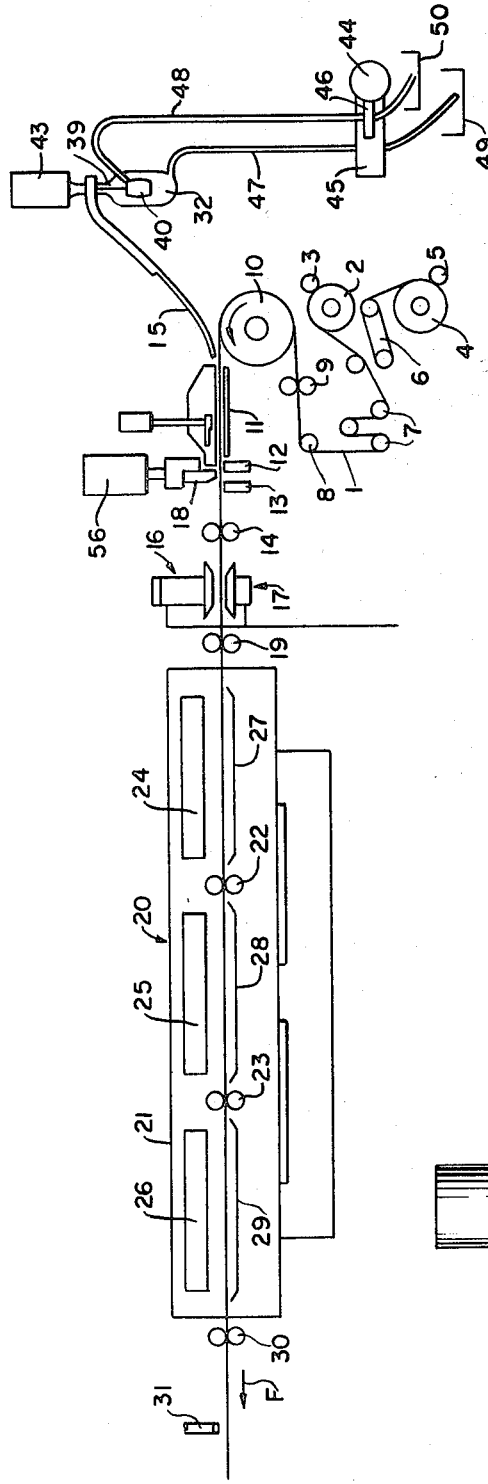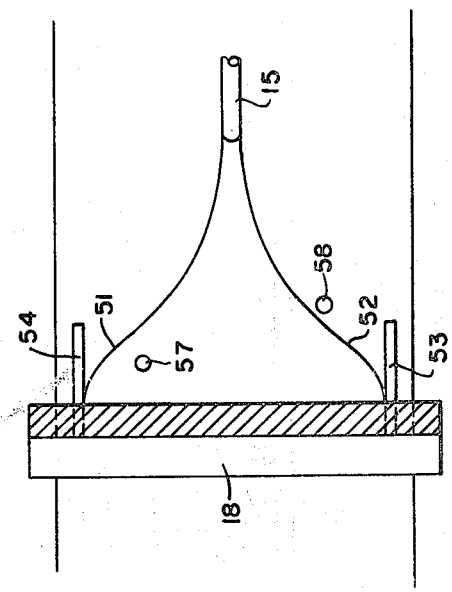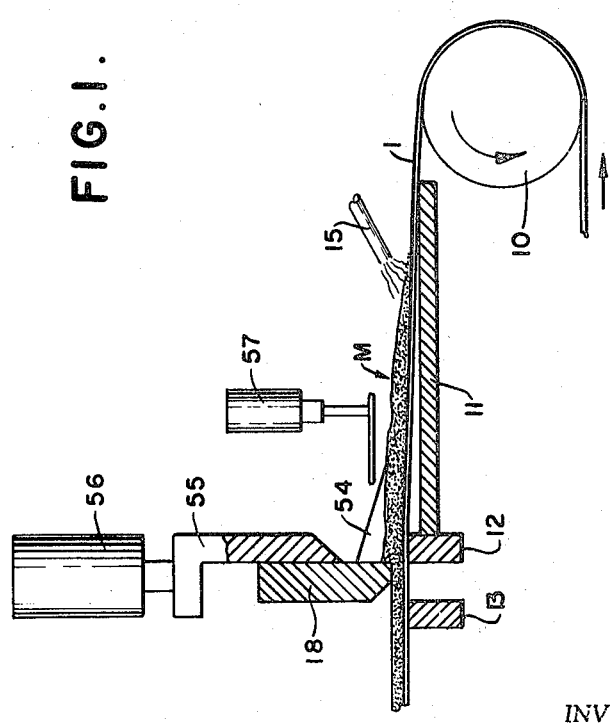

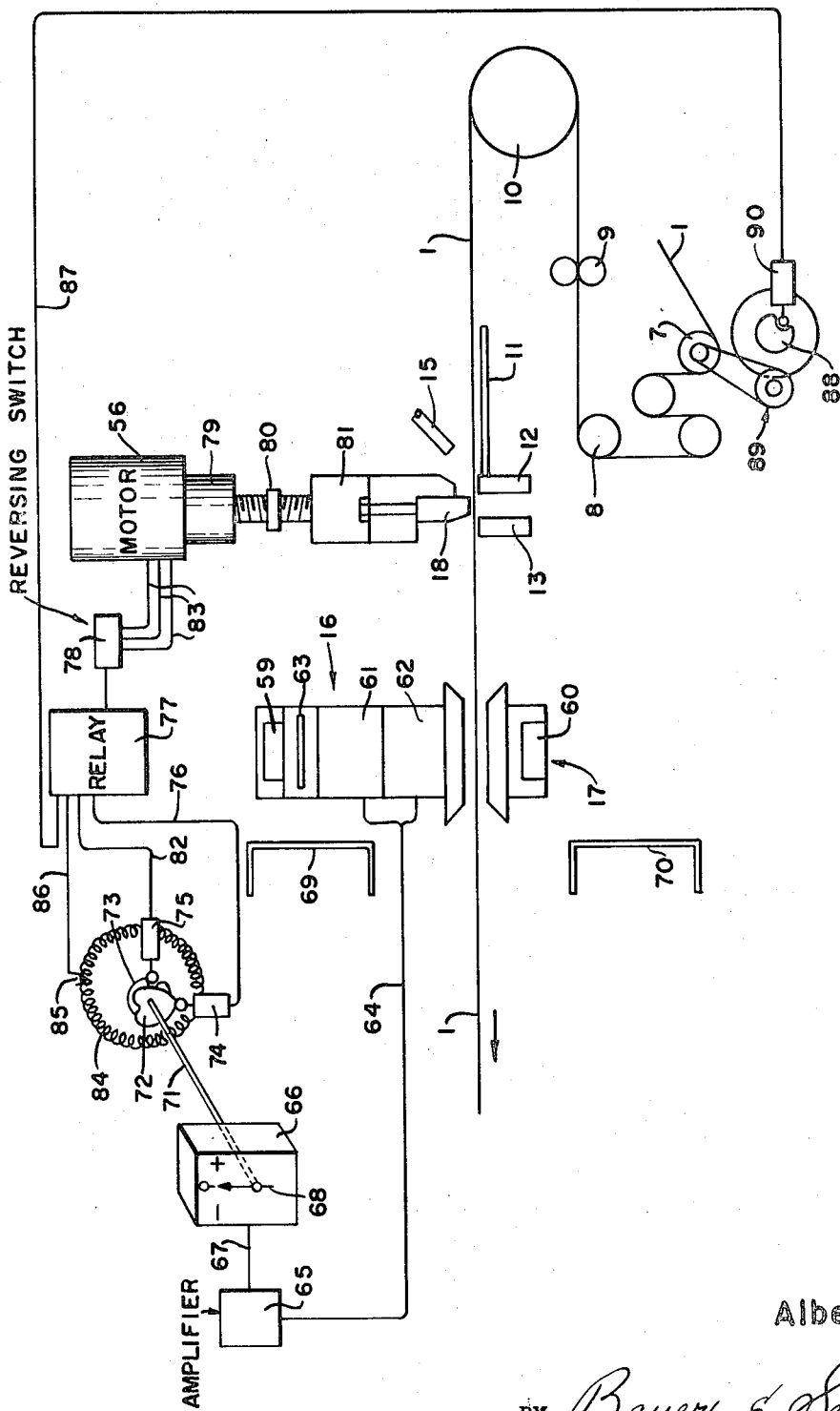

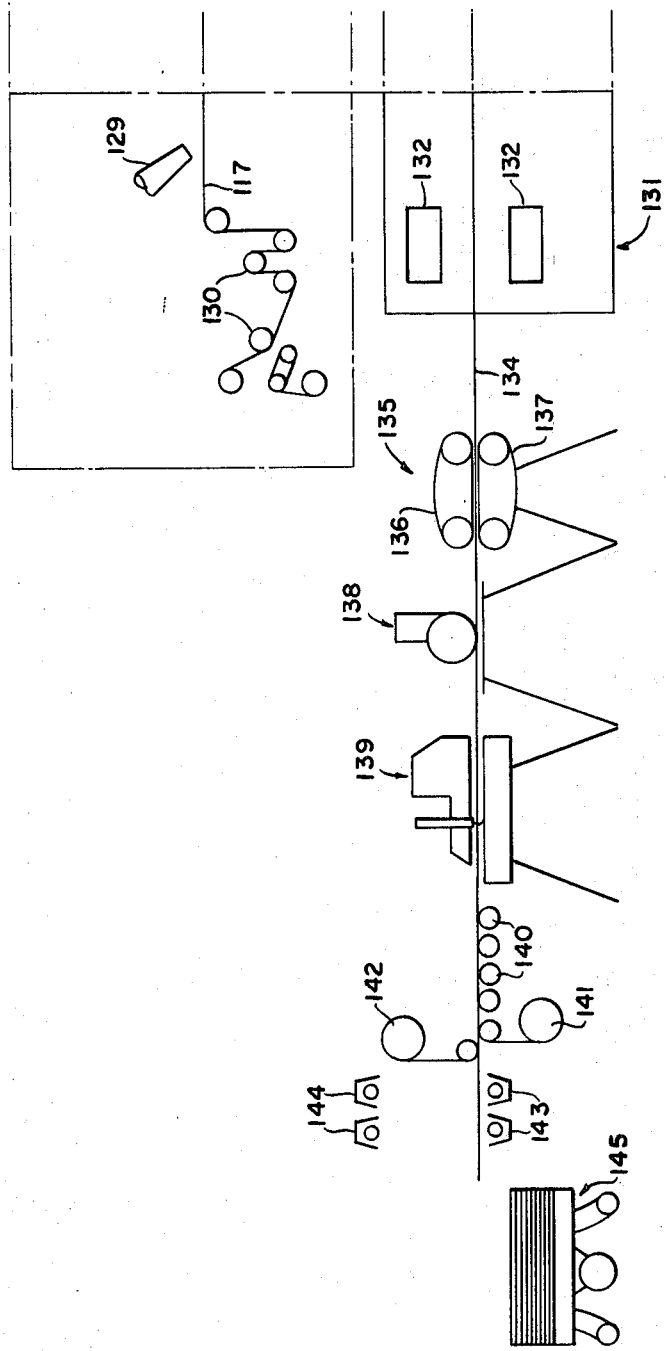

United States Patent Office 3,536,551
Patented Oct. 27, 1970

3,536,551
METHOD OF MANUFACTURING COMPOSITE
LAMINATED RESINOUS SHEETS
Albert Simon, Mont-Saint-Aignan, France, assignor to
Compagnie de Saint-Gobain, Neuilly-sur-Seine, France
Filed May 15, 1967, Ser. No. 638,229
Claims priority, application France, May 18, 1966,
62,068
Int. Cl. G01 1/00
U.S. Cl. 156—64                                11 Claims

ABSTRACT OF THE DISCLOSURE

Method and apparatus for production of laminated resinous sheets. Two films as they are individually unwound from supply rolls, are constantly maintained taut in longitudinal and transverse planes while being coated each with a continuously prepared mix of resin and catalyzer. One film moves horizontally while its coating is partially cured and sequentially covered with layers of resin and material such as glass fibers. The other film with partially cured resinous coating is then brought into surface contact with the layer of fibers. The two films and interposed layer are pressed together and cured to complete the web. The two films are then stripped away and the web is cut into lengths.

---

This invention relates to the production of composite sheets of resinous materials and, in particular, to such sheets reinforced by a central or intermediate lamina of mineral or vitreous fibers or grains.

Where such fibers are used for a layer of intermediate reinforcement between upper and lower exposed layers or cured resin, it was inevitable in the prior art, that some of these fibers crop out through the protective layers of resin, or are emplaced so close to the exposed surfaces thereof that the outer resin layers afford little or no protection to the interposed fibers at such areas. Thus, contrary to their intended purpose, the outer layers do not afford sufficient protection to the fibers. As a result, the sheet about such areas of exposed or nearly-exposed fibers do not have sufficient protection against mechanical abrasion or wear, weathering or climatic exposure.

It is known to cover the surface of a central layer such as mineral fibers, with a continuous layer of resin which is capable by reason of its chemical properties, to essentially unite or become integral with the subjacent resin forming the composite sheet, and having a thickness sufficient to afford the desired or necessary protection.

This covering film is emplaced during the continuous fabrication of the sheet itself which, as has been stated, is formed by the lamination between two layers, of an interposed reinforcing layer. The operation involves spreading resinous layers on one face of each of two supplemental films just before they are applied to and over the central reinforcing layer which constitutes the principal element of the composite sheet.

After assembly and hardening of the sheet in an appropriate oven or dryer, the supplemental films are peeled off but, due to the affinity of the resinous covering layers, these remain adherent to the interposed material or lamina of fibrous reinforcement.

In order to keep costs at a minimum, these resinous layers are very thin. However, this requires that they be precise, uniform and regular in thickness, in order to provide assured protection and to impart an attractive appearance to the completed sheet.

The present invention proposes and has for its chief object, an apparatus and method which enable the production of sheets of the character described, having very thin resinous protective layers or coverings but which are, at the same time, precisely uniform in thickness.

In accordance with the invention, the mix of protective resin and its hardener or catalyst, are prepared as the work progresses and continuously deposited smoothly upon the supplemental films which, as they are unwound from prepared rolls thereof, are continuously kept perfectly smooth by an applied tension which is constant and uniform. The supplemental films are then maintained under this tension in both the longitudinal and lateral directions, while being subjected to a thermal treatment in order to bring about an optimum gelation of the applied resin and thus to assure its proper adhesion to and integration with the resinous charge which is interposed between the two layers to complete the sheet. The protective layers of resin also thus are made impervious to the fibers or the granules which are embedded in the resinous binder of the central or principal lamina. The sheets are thus prepared for use in the regular way.

Since the resin and catalyzer therefor are mixed and prepared continuously as the work progresses, and applied almost immediately after mixing, a very fine and precise control of the degree of polymerization and gelation is made possible. The supplemental films and their coatings are brought into contact with the material forming the central or reinforcing lamina, at the exact moment which will assure the impermeability of the resinous layers to the fibrous or granular materials of the central layer.

In order to realize maximum benefits from the invention it is advisable (a) to carefully control and regulate the tension of the supplemental films in both the longitudinal and transverse dimensions thereof; (b) to maintain this tension during manufacture of the sheet; (c) to carefully control the proportions and mixing of the resin and catalyzer; (d) to feed the mixture evenly, thinly and uniformly onto the films; and (e) to precisely control the gelation of the applied mix in an appropriate oven or dryer.

It is therefore the chief object of this invention to provide a method and an apparatus for the production of composite sheets of the nature aforesaid.

A further object is to provide a method and an apparatus wherein the supplemental films are maintained taut in both their longitudinal and transverse dimensions, are coated on one surface each, with a layer of continuously-mixed resin and catalyzer, which is then immediately, precisely and uniformly spread over the area of the films, to a definite desired thickness, and are immediately assembled with an intermediate layer of fibrous and/or granular central reinforcing lamina.

A further object is to provide an apparatus of the type mentioned, which uniformly tensions the supplemental films in mutually normal directions in the planes thereof, while feeding the resin-catalyzer mix thereonto; in evenly spreading the mix, screeding it to uniform thickness, and partially curing or congealing the resin just before the coated films are brought into full surface area contact with the fibrous or like materials which are to form the central lamina.

Yet another object is to provide an apparatus wherein the spreading of the applied resin-catalyst coating is continuously gaged and the rate of flow of coating is automatically correlated with the rate of continuous feed of film so that precisely the correct amount of resin is applied at all times, to thus maintain a uniform thickness of coating.

Still another object is to provide an apparatus wherein the thickness of the spread coating is gaged, periodically or continuously, the screeding of the resin-catalyst mix is correspondingly controlled automatically, to maintain constant to a high degree of precision, the thickness of the applied coating.

Another object is to provide a method and an apparatus which produce high quality sheets of the nature stated, which are uniform to a very high degree of accuracy as to thickness and texture, and in which the protective layers of resin are of uniform thickness and all fibrous or like materials of the central lamina are fully confined, covered and protected.

Still another object is to provide a method and apparatus as in the preceding paragraph, which is readily adapted to substantially complete automation and thus capable of production of high quality sheets at minimum cost per unit area or mass of sheet.

Other objects and advantages of the invention will become apparent to those skilled in the art, after a study of the following detailed description. The apparatus disclosed fulfills to a high degree, all of the objects stated.

In the drawing:

FIG. 1 is a schematic view showing in side elevation an apparatus for applying a thin coating of resin and catalyzer to one of the supplemental or protective films;

FIG. 2 shows to a greatly enlarged scale, one of the means for applying the coating of resin to one of the films;

FIG. 3 is a plan view of FIG. 2 showing the general arrangement and relation of important parts, other parts being omitted for greater clarity of illustration;

FIG. 5 is a schematic view showing the gaging mechanism by which the thickness of the resin coating being applied to the film, is determined and maintained constant at a desired value;

FIG. 6B shows the remaining or downstream portion of the same apparatus.

Figure 4:
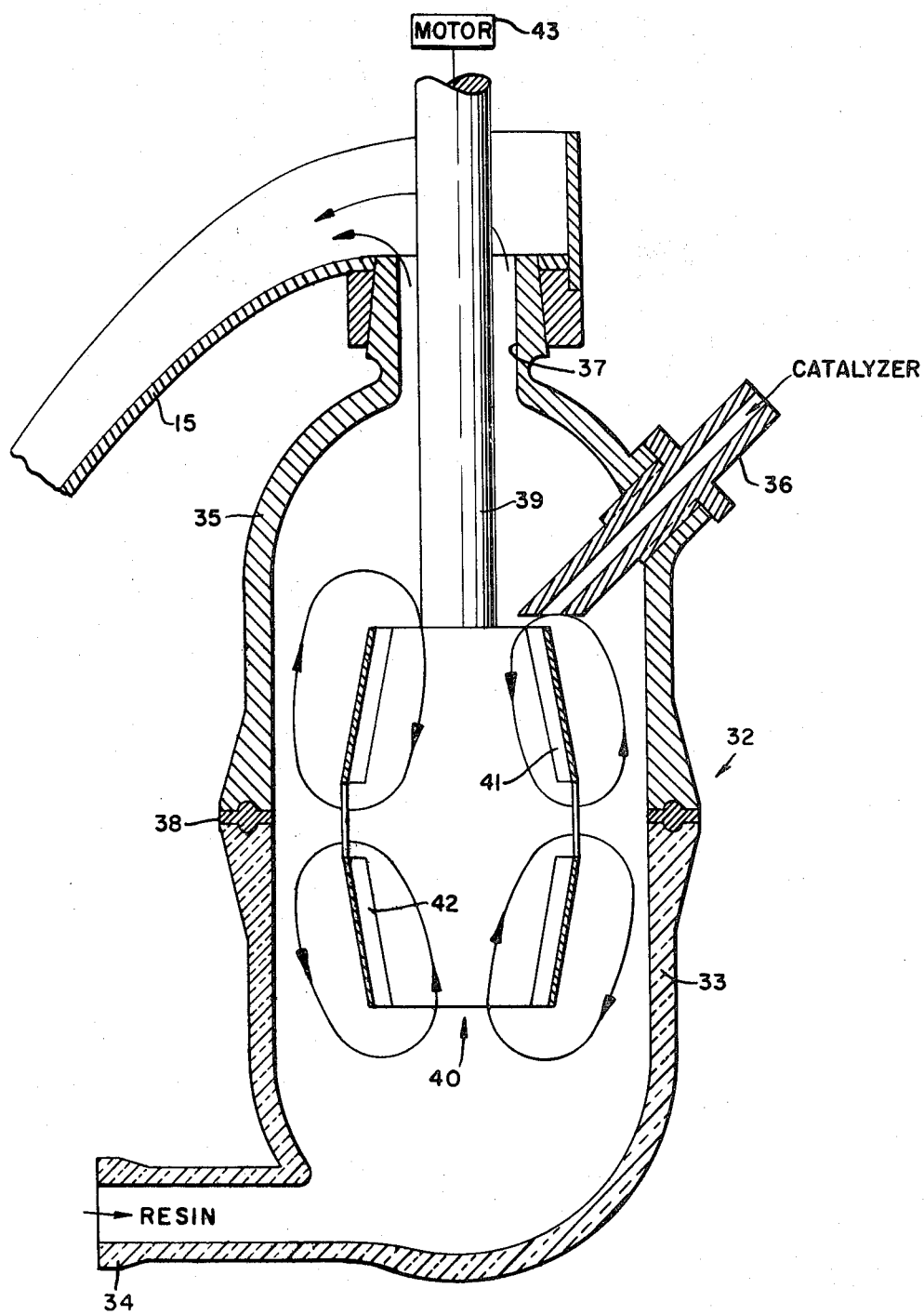
FIG. 4 is a central axial section to a scale greatly enlarged over FIG. 1, of the means for mixing the resin and its catalyzer.

Referring to FIG. 1, a roll 2 of protective film 1 is braked by means generally indicated at 3 so that the film is continuously drawn off and maintained under constant and uniform tension despite changes in the diameter of the roll as the film is withdrawn. In order to assure continuity of the film, a reserve roll 4 together with its braking means 5 and mechanism 6, is maintained, by which film from roll 4 is automatically substituted when the film of roll 2 has been exhausted.

Film 1 passes about a number of tensioning rollers such as those indicated at 7. These are maintained under constant braking action or restraint so that the film is continuously maintained taut under uniform tension. The film is drawn off in the direction indicated by arrow F, FIG. 1, by means shown schematically at 135, FIG. 6B. After traversing reversing roller 8 the film passes between two pairs of rollers 9 so disposed that each pair grips a respective edge only of the film. The axes of rotation of each pair are parallel but inclined with respect to the direction of travel of the film, so that the film is also placed under tension in its transverse dimension. That is to say, each pair of rollers 9 acts to apply a force to its edge of the film, having a component directed transversely away from the center line of the film.

The film is thus placed under uniform tension in both the longitudinal and transverse directions of its translation, and then passes to and about a roller 10 of relatively large diameter. Preferably this roller is faced with polished chromium plate. After passing about roller 10 the film moves horizontally onto and over a table 11. The table is shown in greater detail upon FIG. 2, from which it is noted that the film passes from roller 10 at a level below the adjacent or trailing edge of the table so that it is, in effect drawn across this edge at a small acute angle and is thus freed of dust or foreign particles adherent thereto. The material thus scraped off drops downwardly and thus does not collect against the edge of abutment plate 12, as it would otherwise do, to deleteriously affect the operation of the coating mechanism. For example, accumulation of any such material against plate 12 would disturb the planarity of the film and produce an uneven distribution or thickness of the coating. The cleaning action of the trailing edge of table 11 does not, however, damage the film.

Abutment plates 12 and 13 are parallel, have horizontally coplanar upper edges, and extend transversely across the film, so that as the latter is drawn thereacross, it is perfectly flat and stretched under uniform tension in both the longitudinal and transverse directions. This condition is promoted and maintained by two pairs of pinch rollers. One pair is identified at 14, FIG. 1. Like rollers 9 previously described, each pair grips the film at a respective edge thereof and having axes inclined at an obtuse angle to the direction of travel of the film, exert component forces which are equal and opposite in a direction away from the center line of the film.

As film 1 passes over table 11, a supply of resin-catalyst coating mix is deposited thereon from nozzle or tube 15. The flow rate is precisely controlled by mechanism subsequently described. The resinous mix is flowed uniformly over the film in the manner also subsequently described.

After passing from between transverse tensioning or pinch rollers 14, film 1 passes between upper and lower gaging elements generally identified at 16, 17 and which, as later described in detail in connection with FIG. 5, continuously or periodically at closely spaced time intervals, sense the thickness of the coated film passing between them and act to automatically control the vertical position of screed plate 18, FIGS. 1, 2 and 5, to maintain the resinous coating at uniform thickness. The film next passes to and between a third set of pinch rollers 19 which are like rollers 14 and act to maintain the transverse tension in the film.

After passing the two pairs of pinch rollers 19, the coated film enters an oven or dryer generally identified at 20, where gelation or partial curing of the resin-catalyst mix is effected. This oven comprises a heat-insulated enclosure 21 within which there are a plurality of pairs of pinch rollers 22, 23, mounted and operating as and for the purpose previously described for roller pairs 9, 14 and 19, and which grip the edges only of the coated film and operate to maintain it under constant and uniform transverse tension.

Enclosure 21 also contains a plurality of infra-red heaters 24, 25, 26 which act successively to direct heat onto, and to gel the resin coating to the proper consistency. Reflectors 27, 28, 29 are disposed each opposite its respective heater, on the lower side of the film and assist in the proper and uniform heating of the coating.

Immediately after leaving heater 20, the film passes to and between two pairs of pinch rollers 30 which operated in the same manner and for the same purpose as roller pairs 9, 18, etc. Next, the material which is to form the central lamina or layer of reinforcement is deposited onto the coating of film 1, by means generally indicated at 31.

The tube or nozzle 15 which deposits the resin-catalyst mix onto film 1, has been previously mentioned. FIGS. 1 and 4 show the mechanism by which the mixture is prepared and immediately forced to, or allowed to flow from the nozzle. Referring to FIG. 4, a pressure vessel 32 comprises a lower half o rsection which may be glass as shown, and provided with an inlet coupling 34 for resin, and an upper metallic half 35 provided with an inlet coupling 36 for catalyst, and an outlet 37 for the mix. The two halves are united in a pressure-tight joint 38.

A shaft 39 extends downwardly through outlet opening 37 and has a mixer generally identified at 40 and provided with blades like 41, 42, attached to its lower end. At its upper end the shaft is coupled with the shaft of a motor 43. See also FIG. 1. Resin is introduced under pressure and at a carefully controlled rate, through coupling 34. Hardener or catalyzer is introduced under pressure and at a precisely controlled rate through coupling 36.

Referring to FIG. 1, a motor 44 drives both pumps 45 and 46. Pump 45 supplies resin to mixer 32 by way of pipe 47, while pump 46 impels catalyzer through pipe 48 to inlet 36. Each pump may be driven through its own variable speed drive so that the proportion resin to catalyzer is at all times under precise control. Alternatively, of course, each pump 45, 46 may be driven by its own variable speed motor. Numerals 49 and 50 represent schematically reservoirs of liquid resin and catalyzer, respectively.

The mix M of resin and catalyzer is conducted through outlet 37, to and through conduit 15 where, as shown at FIG. 2, it is deposited upon the film 1.

The means for spreading and distributing the mix upon film 1, in a uniform layer of precise and exact thickness, is shown upon FIGS. 2 and 3. The two backing plates 12 and 13 have been previously mentioned, as well as table 11. Plate 12 has its upper edge slightly elevated above the level of the table, as shown, FIG. 2. As the mix is deposited upon the longitudinal center line of film 1, it spreads out along and between normal boundary lines as indicated at 51, 52, FIG. 3, until it contacts and is confined by and between guide plates 53, 54, both of which are supported with their downstream ends in contiguous relation with screed plate 18.

As the mix passes with the film beneath plate 18 it is smoothed and thinned as shown upon FIG. 2. This plate is attached to and supported by a member 55 which, in turn, is adjustable vertically in response to turning in one direction or the other, of a control motor as described later in greater detail in connection with FIG. 5. The straight lower edge of plate 18 is maintained parallel with and transversely across the taut film at its area between lower or backing plates 12 and 13, so that vertical adjustment of plate 18 under the action of motor 56, correspondingly adjusts the thickness of the screeded mix M.

The rate of deposit of the mix must be regulated with respect to the rate of travel of the film. If the mix were deposited at too great a rate, it would pile up behind plate 18 and deleteriously affect operation of the apparatus, while if deposited at too low a rate, there would result hiatuses in the coating and the resulting sheets would be defective. To assure feed of resin-catalyst mix at precisely the correct rate, I provide two electronic detectors or gage elements 57, 58, of the capacitance type, located at fixed points upstream of screed plate 18 but at different distances therefrom. Referring in particular to FIG. 3, detector 57 is located nearer to the plate and is so positioned that when the flow of mix has normal boundary lines such as 51, 52, it is over the spreading layer of mix when the latter is being deposited at the correct rate. On the other hand detector 58 is more remote from plate 18 and is so positioned that normally, that is, when the mix is being deposited at the correct rate, it is over an area of the film not yet covered or coated thereby.

By means not shown, detector 57 controls a valve in tube or conduit 15 and acts to increase the flow of resin therefrom, when and if the spreading coating or mix does not pass beneath this detector. On the other hand, if resin-catalyst mix is being deposited at too great a rate, it will spread to the area beneath detector 58 so that the normally-balanced condition of this detector will be upset and the control valve in conduit 15 will be correspondingly closed to thereby reduce the flow rate of the mix. When normal flow rate exists as indicated by boundary lines 51, 52, FIG. 3, both detectors 57, 58 are de-energized or quiescent. These detectors afford a sensitivity of control which, because of the thinness of the resin coating, would not be possible with the use of mechanical feelers, for example, and assure that all areas of the film are coated with mix to a uniform thickness, and that all coated areas are uniformly polymerized and gelatinized to the same degree in the oven through which the coated film subsequently passes. These detectors also assure that at all times, resin mix is being deposited at a rate such as will provide a smooth, even and uniform coating without, however, an excessive pile-up of the mix behind and against plate 18.

Referring to FIG. 5, after passing from the screening means just described in connection with FIG. 2, the film or pellicle 1, covered with its coating or resin-catalyzer mix of regular and even thickness of say, 0.05 mm., enters between upper and lower thickness controller gages 16 and 17, previously mentioned. These devices comprise two sources of beta rays positioned in opposition. That is, one source 59 is above the coated film and the other 60, is directly below element 59, and the film. These sources irradiate two ionization chambers 61 and 62, respectively. The rays from source 59 are effective upon chamber 61 while those from source 60 are effective upon chamber 62. Between sources 59 and 60 there is a sample or specimen 63 of material like film 1 and its coating of proper or desired thickness or mass per unit area for the sheets being produced.

Thus when the coated film under production is of the same thickness as specimen 63, both film and specimen absorb the same quantity of rays, each from its respective source 60 and 59, and the outputs from chamber 61 and 62 are equal and balanced. These two outputs are conveyed over lines schematically indicated at 64, to a push-pull type of amplifier 65 where they are amplified and compared. A sensitive galvanometer 66 is connected by line 67 with the output of the amplifier. When the two inputs to amplifier 65 are equal, they cancel out and there is no voltage supplied to instrument 66. Under such condition the needle or sensitive element of the galvanometer is in central or neutral position and no control action is effected thereby. Such a condition is present when the coated film passing between gaging elements 16 and 17 has precisely the same thickness or mass per unit area as specimen 63.

The connections are such that when the thickness of the lamina, or the mass per unit area thereof, of the layer of material being applied to the coating of film 1, is less than the corresponding thickness or mass per unit area of specimen 63, needle 68 is deflected to the left. Conversely, when the thickness of the lamina is greater than that of the specimen, the needle is deflected to the right. The assembly including elements 16, 17 and parts associated therewith are mounted on tracks such as 69, 70, disposed transversely of the film, and are thus movable back and forth across the width of the film so that all areas are continuously scanned and it is possible to continuously trace or determine cross sectional profiles of the coating at the time each cross section passes between the gage elements.

Returning to galvanometer 66, shaft 71 thereof, carrying needle 68 controls through a follow-up, now shown, a pair of cams 72, 73. Cam 72 acts upon the toggle or plunger of a first normally-open microswitch 74. Cam 73 similarly acts upon the toggle or plunger of a second normally-open microswitch 75. The arrangement is such that both switches are open when the inputs from amplifier 65 to galvanometer 66 are equal or balanced, that is, when the coating of the film passing between elements 16 and 17 is of the same thickness of mass per unit area as specimen 63. When needle 68 is deflected to the left as viewed upon FIG. 5, as a result of the coating being too thin, cam 72 is turned and closes switch 74 and an input signal is conveyed over line 76 to relay 77, the output from which closes a reversing switch 78, in turn controlling the energization and direction of rotation of motor 56, previously mentioned.

This motor drives a differentially-threaded screw 80, by mechanism generally identified at 79, to thus vertically translate screed plate 18, through a support 81 therefor. The support is mounted for vertical translation only, by guide means not shown. When the coating on film 1 is too thin, the connections are such that motor 56 is energized and rotated in a direction to elevate screed plate 18 and thus to increase the thickness of the coating. Likewise, when the coating is too thick, needle 68 and its shaft 71 are deflected to the right as viewed upon FIG. 5, switch 75 is closed and a signal is conveyed over line 82 to relay 77 thus energizing motor 56 in the opposite or reverse direction to effect lowering of screed plate 18 and thus lessening the thickness of the coating being applied. Screw 80 may be given a manual adjustment for calibration of the apparatus.

Still referring to FIG. 5, tensioning roll 7 previously described, drives a cam 88 through a speed-reducing mechanism generally identified at 89 and shown by way of example as consisting of a belt and pulley arrangement. The cam is associated with the plunger of a normally-open switch 90, so that this switch is closed momentarily for each rotation of the cam. The switch thus creates a signal of limited duration for each predetermined successive length of film fed through the machine, and which is conveyed over line 87 to instrument 77.

The connections in instrument 77 are such that the signals from switch 74 or 75, as the case may be, and from potentiometer 84, are effective upon motor 56, only during the relatively brief periods of closure of switch 90. Thus, vertical corrective adjustment or translation of screed plate 18 is effected in fine, precise stages or steps. The direction of translation, as precisely explained, depends upon whether the coating being applied to film 1, is too thin or too thick, while, due to the action of switch 90 the amount of translation of the screed plate is controlled conjointly by the intensity of signal from potentiometer 84, that is, the amount of correction needed to restore normal thickness of the resin, and the rate of feed of film.

In this way the thickness of the coating being applied is constantly scanned and precisely controlled to a desired high degree of accuracy, and may be varied as desired by substitution for specimen 63, of other specimens having different thickness of coating or mass per unit area of coating.

Figure 6A:
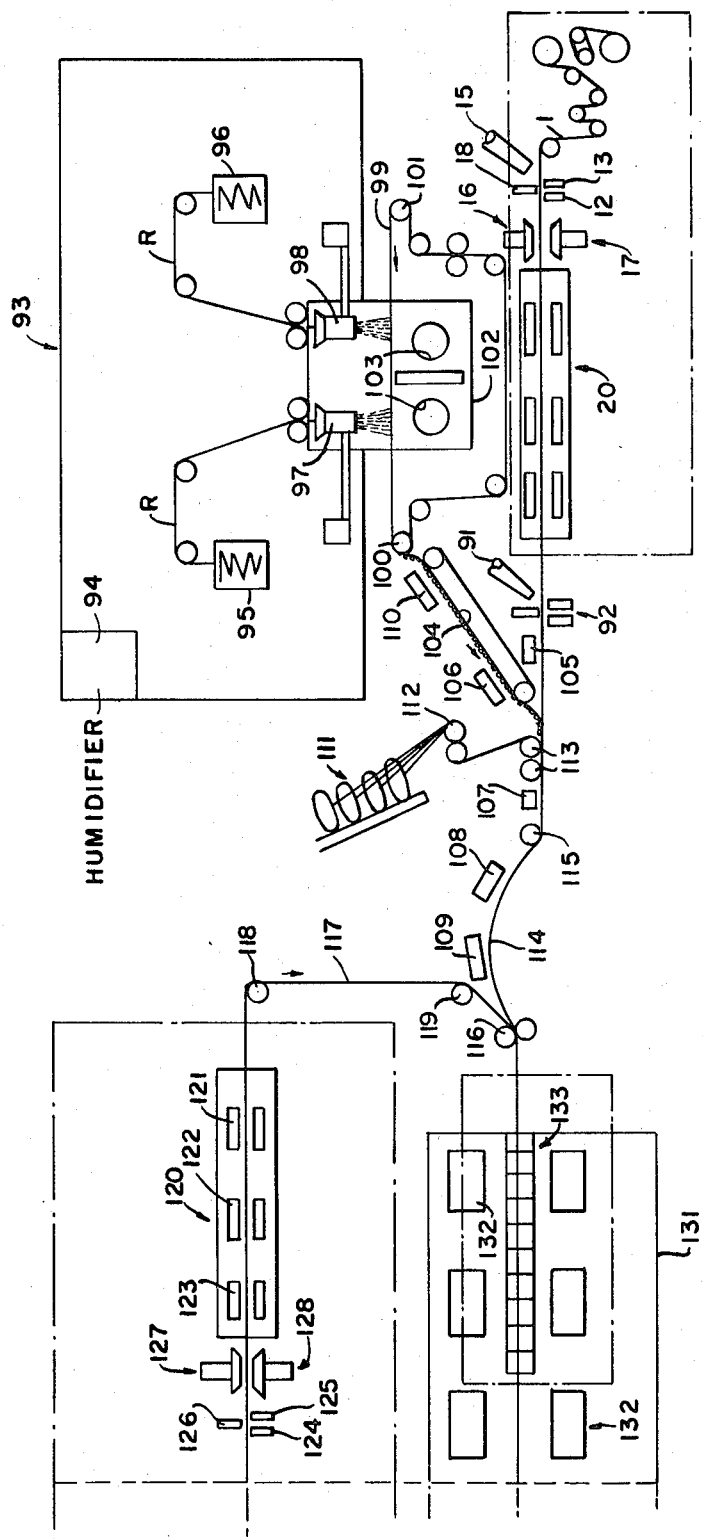
FIG. 6A shows the upstream portion of a complete production line apparatus.

Referring to FIG. 6A, the film with its coating of partially cured resin, passes from oven 20, leftwardly and is immediately covered at 91 with a principal layer of resin, which is smoothed and screeded by plates generally identified at 92. Since these plates are arranged and operated and controlled in the same way and by similar means to those described previously in connection with plates 12, 13 and 18; FIG. 2, it is unnecessary to repeat the description.

At 93, FIG. 6A, there is indicated generally, apparatus for cutting glass fibers or roving into lengths of, say 50 mm. The enclosure includes a humidifier 94 for the air therein, for the purpose of avoiding electrostatic phenomena, otherwise troublesome. Glass fibers R are drawn from containers such as 95, 96, passed to cutters 97, 98, cut into short lengths as aforesaid, and deposited upon the upper pass of an endless belt 99. This belt is preferably of link or open mesh, formed of stainless steel and moving in the direction indicated by the arrow, between guide rollers 100, 101. The cut fibers are deposited onto the upper pass of the belt as it passes through an enclosure 102. Uniform distribution and deposition of the cut fibers is aided by means, not shown, which exhaust air through a plurality of openings in the enclosure, such as 103.

The cut fibers distributed on and over belt 99, pass therefrom by gravity and drop onto a second belt 104 inclined downwardly to the left and which, in turn, deposits the cut fibers or roving onto the layer of resin applied at 91. Belt 104 is also preferably of stainless steel mesh or link construction. Heaters 105 through 110 are placed at judiciously selected locations over and along the paths of the roving and film.

At 111, FIG. 6A, are indicated a plurality of pivoted rolls or spools of thread, for example, nylon. These are drawn downwardly over and about rollers 112 and forced into and embedded in the resin in regularly-spaced positions laterally of the film. Rollers 113 are provided for this purpose. The action is perfected by maintaining the threads under tension while passing the coated film upwardly over an arcuate plate as indicated at 114, and to which it is held by rollers 115, 116.

At the location of roller 116 the second or upper film 117 moves downwardly about rollers 118, 119, and is laid onto the laminas on lower film 1. Prior to this, film traverses apparatus similar to that described in connection with FIGS. 1, 2 and 3, wherein it is maintained under longitudinal and transverse tension while a layer of resin-catalyzer mix is applied, smoothed, screeded, and gaged as to thickness. Since the apparatus in which this is done is essentially like that previously described in connection with FIGS. 1, 2 and 3, it is deemed sufficient, referring to FIG. 6A, to identify oven 120, driers 121, 122, 123 therein, lower transverse plates 124, 125, spaced in the direction of travel of the film, upper or screed plate 126, thickness gages 127, 128, upper and lower, and, referring to FIG. 6B, nozzle 129 and film feed rolls 130. So film 117 passes into contact with its coated face toward the exposed resin-impregnated face of the material previously deposited upon film 1. Rollers 116 also act to compress the strip to a desired thickness, and to seal the edges of the upper and lower films together.

The composite strip or web next passes into oven 131, wherein the resin is polymerized by heaters generally identified at 132. If desired, the strip may be shaped as, for example, by applying corrugations therein. Mechanism for doing this is shown at 133.

Passing to FIG. 6B, the cured and completed composite strip, now identified as 134, is drawn along under tension by apparatus 135. This apparatus may comprise upper and lower belts or series of belts, driven by power means not shown. The belts grip strip 134 between them and operate to draw both films through the apparatus under constant longitudinal tension.

Apparatus shown at 138 trims the two side edges of the strip, and at 139 it is cut transversely into sheets of desired lengths. Such means being well known, detailed description thereof is not necessary. The cut sheets pass in succession over supporting rollers 140 where the lower and upper films 1 and 117 are stripped from the sheets as indicated generally at 141, 142. After inspection for flaws and defects at 143, 144, the sheets or panels are transferred to a conveyor 145 and transported to storage.

The upper and lower supplemental films may be of cellulose. They should preferably be impervious to air and dry gas, but able to absorb water rapidly in order to facilitate removal or stripping from the sheets at the termination of fabrication. The resin of the protective layers should be of high quality and resistant to atmospheric deterioration over a wide range of climatic conditions. It should also be resistant to deterioration such as fading, clouding, or yellowing under the action of light, particularly of ultraviolet light. Standard polyester resins prepared from orthophthalic and maleic anhydrides, or from propylene glycol in solution in styrene monomer, afford a resin suitably resistant to climatic deterioration.

Other kinds of unsaturated polyester resins may be used, especially those wherein the orthophthalic anhydride is replaced by isophthalic acid, or resins wherein a portion of the propylene glycol is replaced by neopentyl glycol. These agents also act to protect the interposed layer of reinforcement, against deterioration or aging. Mixture with varying proportions of styrene monomer and methyl methacrylate may be used to improve the quality of the protective resinous coatings.

Several different catalysts may be used to effect rapid gelatinization of the resin at relatively low temperatures and in suitably short periods of time. Among these may be mentioned a dilute solution of naphthylene cobalt, which is of particular value when used in the polymerization of polyester resins, at relatively low temperatures. It is also possible to use organic peroxides such as peroxide of methylethyl acetone, peroxide of methylisobutylacetone, peroxide of cyclohexanone, etc.

For example, if one of the previously identified catalysts is used and mixed immediately preceding deposit of the resin upon the films, with resin such as cobalt naphthenate, the coated surface may be gelatinized at temperatures of about 60° to 70° C., in a period of about 45 to 60 seconds. Losses through evaporation of the monomers are thereby reduced to a minimum.

The principal resin, that is, the one comprising the central layer reinforced by fibers, and which constitutes the main element or layer of the sheet, and is interposed between the two protective resinous layers suitably gelatinized on the respective films of cellulose. This principal resin as well as the glass fibers mixed therein, should not be mixed with the protective coatings. The final product thus consists of two protective coatings of pure resin, each covering a respective surface of the sheet and which prevent the "cropping out" phenomenon common in the prior art and wherein the glass fibers protect in places, through the surface layers of resin coatings. A resin of lower quality and lesser cost may be used for this principal central layer, because it is not required to have great resistance to weathering and deterioration by light, such as is necessary for the protective outer layers.

While I have thus disclosed a method and apparatus for the production of composite or reinforced sheets of resinous materials, numerous changes in form and sequence, and substitutions of equivalents, will readily occur to those skilled in the art, after a study of the foregoing specification. Hence the disclosure is to be taken in an illustrative rather than a limiting sense.

What is claimed is:

1. The method of manufacturing composite resinous sheets comprising, continuously translating a horizontally disposed first film in a horizontal direction, while maintaining the film under uniform longitudinal and transverse tension, continuously mixing resin and a catalyzer therefor, to form a mix, depositing and spreading the mix onto the film to thus form a coating of uniform thickness thereon, partially curing the coating while maintaining the film under longitudinal and transverse tension, depositing a layer of resin onto the partially cured coating, depositing a layer of fibrous or granular reinforcement onto the resin, continuously coating a second film with a continuously-mixed resin and catalyst therefor, partially curing the mix on the second film, bringing the coated surface of the second film continuously into surface contact with the exposed surface of the layer of reinforcement on said first film, and simultaneously curing the two resin-mix coatings.

2. The method of claim 1, comprising depositing the mix onto the tensioned first film to cause the mix to spread laterally outwardly over the film in a normal flow pattern defined by smooth continuous laterally- and outwardly- spreading boundary lines, sensing the presence of mix at a first point between and adjacent said normal boundary lines, sensing the presence of mix at a second point without and adjacent said normal boundary lines, increasing the rate of flow of mix in response to absence of mix at said first point, and decreasing the rate of flow of mix in response to presence of mix at said second point.

3. The method of claim 1, spreading of the mix being effected by passing the coated film beneath the confronting edge of a screed plate extending transversely over, parallel with, and spaced from the tensioned and coated film, by a distance equal to the desired thickness of the coating.

4. The method of claim 3, the screed plate edge being disposed over an unsupported tensioned portion of the coated film.

5. The method of claim 3, repeatedly sensing the thickness of coating mix on the film after screeding thereof, and automatically adjusting said screed edge toward and from the film in accordance with increase and decrease, respectively, of the sensed thickness of the coating mix, to maintain the thickness at a predetermined value.

6. The method of claim 5, the sensing being periodically in accordance with predetermined equal sucessive lengths of film fed for coating.

7. The method of claim 1, and simultaneously with final curing, shaping the completed sheet as by corrugating the same.

8. The method of claim 1, and continuously pressing the films together to unite the partially-cured resin coating and the layer of reinforcement, before final curing.

9. The method of claim 8, and removing the two films, each from its cured resin-mix coating.

10. The method of claim 9, and subsequent to depositing the layer of reinforcement and before application thereto of the second film coating, applying a plurality of laterally-spaced tension filaments onto the layer of reinforcement for embedment therein.

11. The method of claim 1, said layer of reinforcement being glass fiber cut into lengths and deposited in random orientation onto the mix on the first film, the film being cellulose.

References Cited
UNITED STATES PATENTS

| | | | |
|---|---|---|---|
| 3,098,780 | 7/1963 | Krause | 156—280 |
| 3,146,431 | 8/1964 | Betts. | |
| 3,188,256 | 6/1965 | Shoemaker | 156—64 X |
| 3,247,042 | 4/1966 | Denton et al. | 156—313 X |
| 3,259,535 | 7/1966 | Graff | 156—324 |
| 3,296,856 | 1/1967 | Elias | 156—64 X |
| 3,383,266 | 5/1968 | Helm | 156—313 |

BENJAMIN R. PADGETT, Primary Examiner

S. J. LECHERT, JR., Assistant Examiner

U.S. Cl. X.R.

117—16; 156—182, 276